No. 769,058. PATENTED AUG. 30, 1904.
J. P. COLEMAN.
RAILWAY SIGNAL.
APPLICATION FILED DEC. 8, 1902.
NO MODEL. 5 SHEETS—SHEET 1.

WITNESSES:
Walter P. Neubert
W. R. Bradley

INVENTOR
John Pressley Coleman
BY
HIS ATTORNEY

No. 769,058. PATENTED AUG. 30, 1904.
J. P. COLEMAN.
RAILWAY SIGNAL.
APPLICATION FILED DEC. 8, 1902.
NO MODEL. 5 SHEETS—SHEET 2.
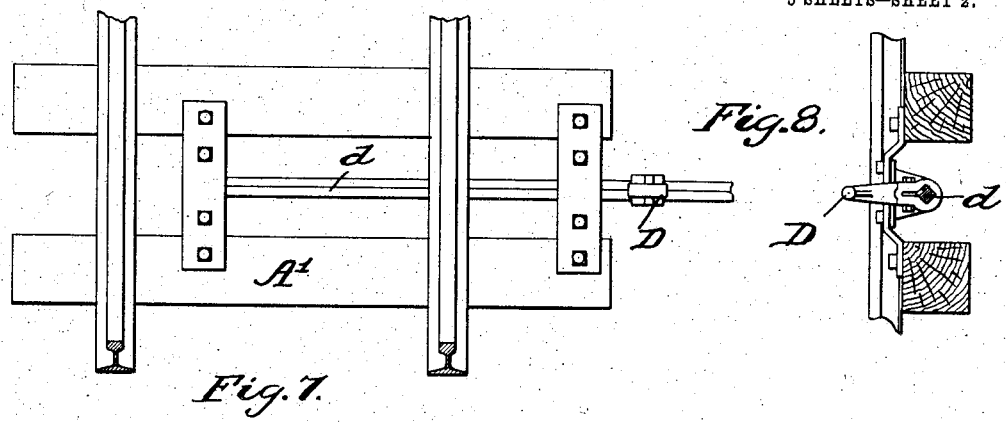
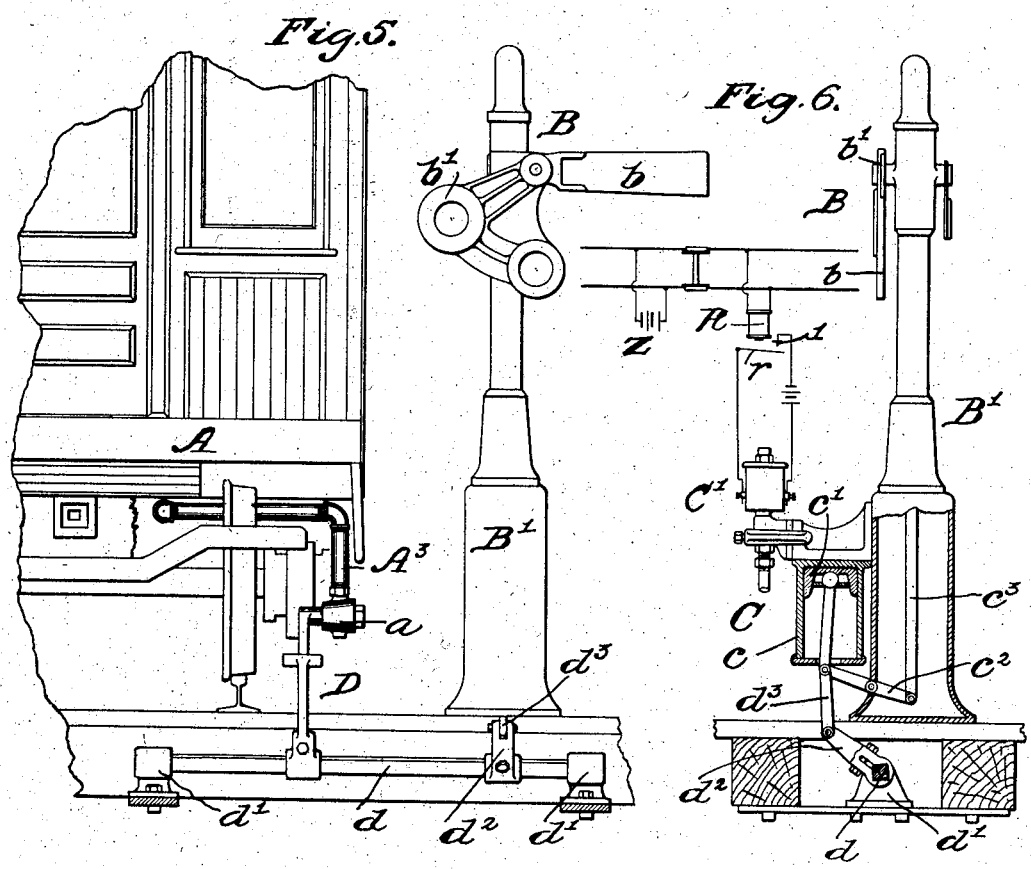
WITNESSES:
INVENTOR
John Pressley Coleman
BY
HIS ATTORNEY

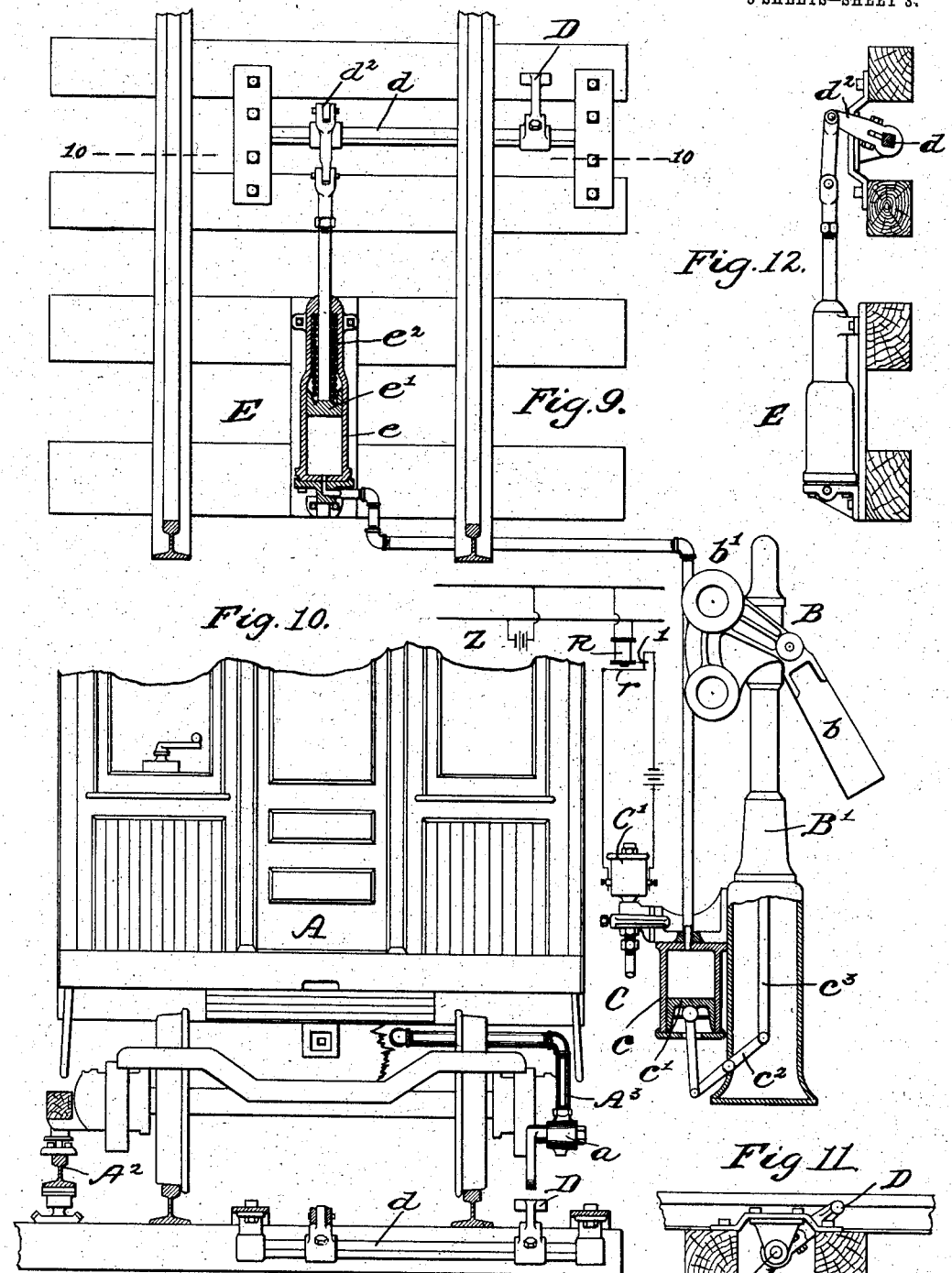

No. 769,058. PATENTED AUG. 30, 1904.
J. P. COLEMAN.
RAILWAY SIGNAL.
APPLICATION FILED DEC. 8, 1902.
NO MODEL. 5 SHEETS—SHEET 4.
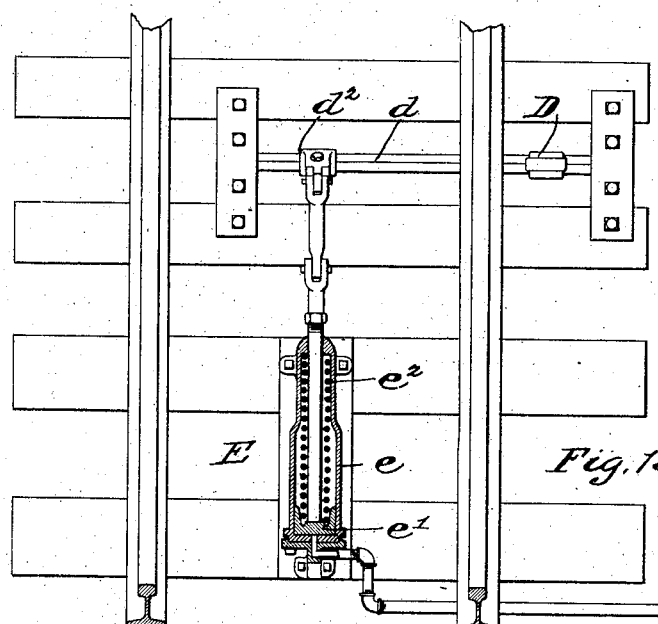
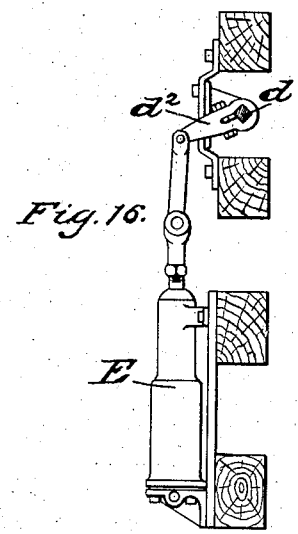
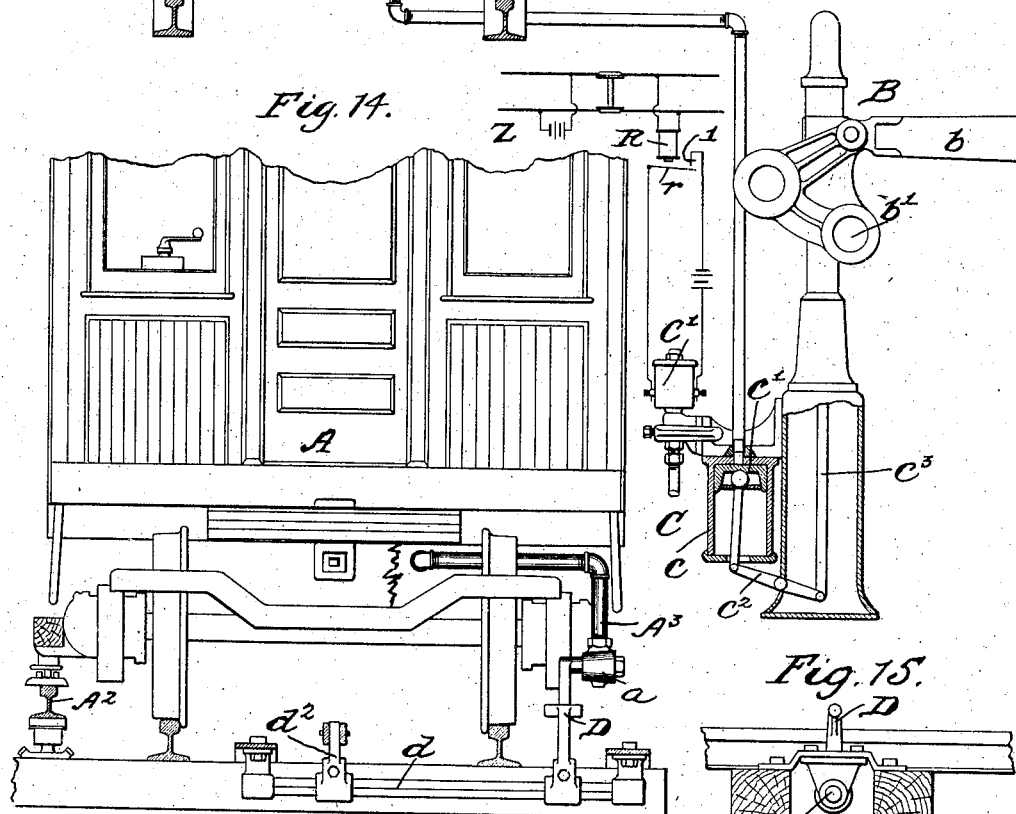
WITNESSES:
Walter P. Neubert
W. P. Bradley
INVENTOR
John Pressley Coleman
BY
Fred E. Cruse
HIS ATTORNEY No. 769,058. PATENTED AUG. 30, 1904.
J. P. COLEMAN.
RAILWAY SIGNAL.
APPLICATION FILED DEC. 8, 1902.
NO MODEL. 5 SHEETS—SHEET 5.

WITNESSES:
Walter P. Neubert
W. P. Bradley

INVENTOR
John Pressley Coleman
Geo. E. Cruse
HIS ATTORNEY

No. 769,058.                                                                    Patented August 30, 1904.

UNITED STATES PATENT OFFICE.

JOHN PRESSLEY COLEMAN, OF EDGEWOOD, PENNSYLVANIA, ASSIGNOR TO THE UNION SWITCH AND SIGNAL COMPANY, OF SWISSVALE, PENNSYLVANIA, A CORPORATION OF PENNSYLVANIA.

RAILWAY-SIGNAL.

SPECIFICATION forming part of Letters Patent No. 769,058, dated August 30, 1904.

Application filed December 8, 1902. Serial No. 134,283. (No model.)

*To all whom it may concern:*

Be it known that I, JOHN PRESSLEY COLEMAN, a citizen of the United States, residing at Edgewood, in the county of Allegheny and State of Pennsylvania, have invented certain new and useful Improvements in Railway-Signals, of which the following is a specification.

My invention relates to railway-signals, and particularly to that class of railway-signals which automatically stop a train should it proceed past a railway-signal giving a "stop" indication.

I will describe a railway-signal embodying my invention and then point out the novel features thereof in claims.

Figure 3:
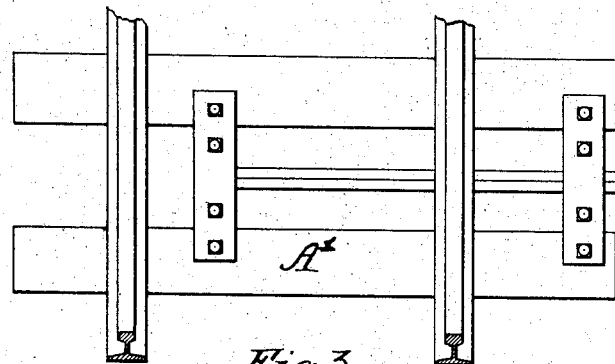
Figure 4:
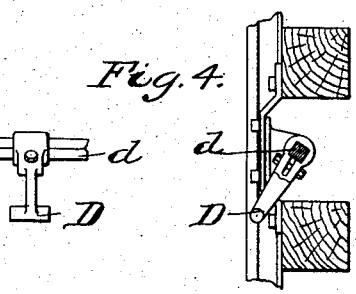
Figure 1:
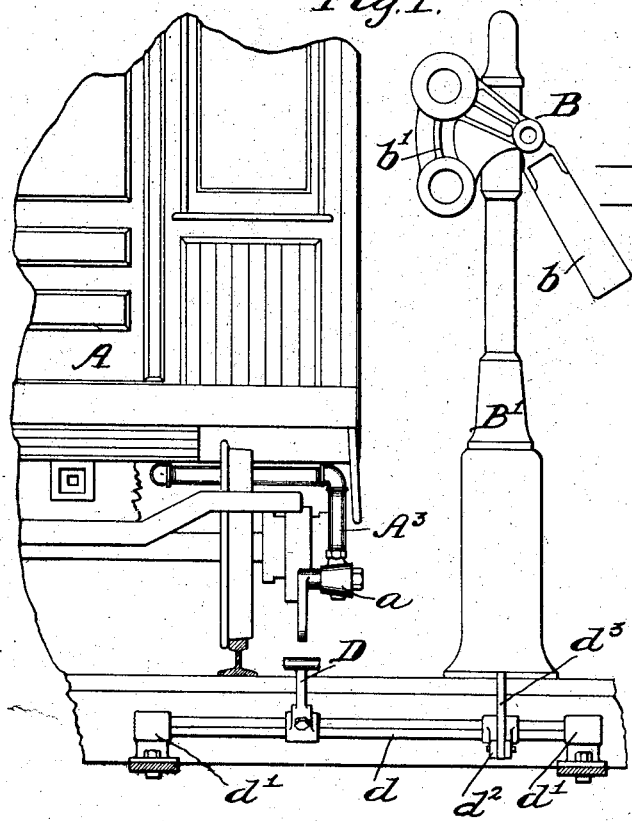
Figure 2:
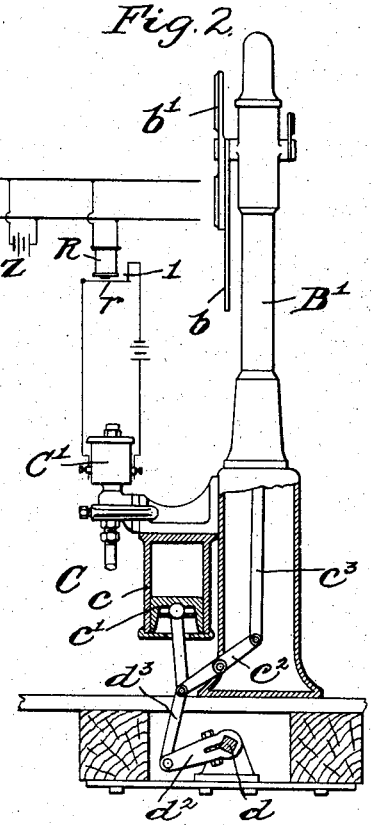
Figure 17:
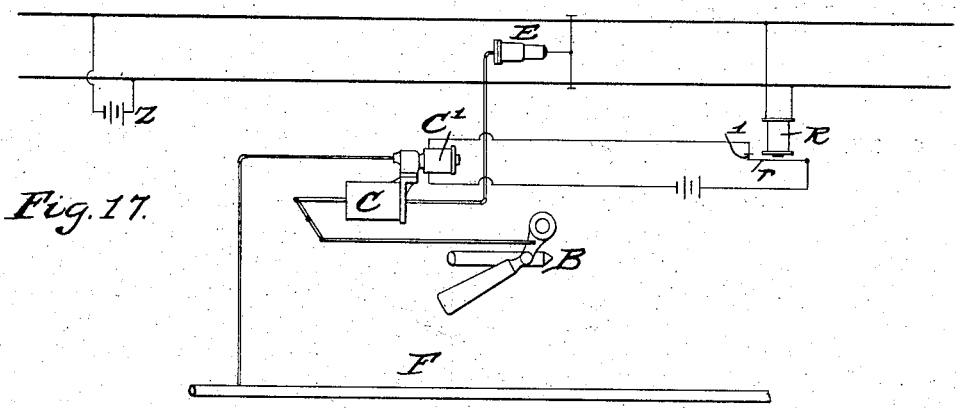
Figure 18:
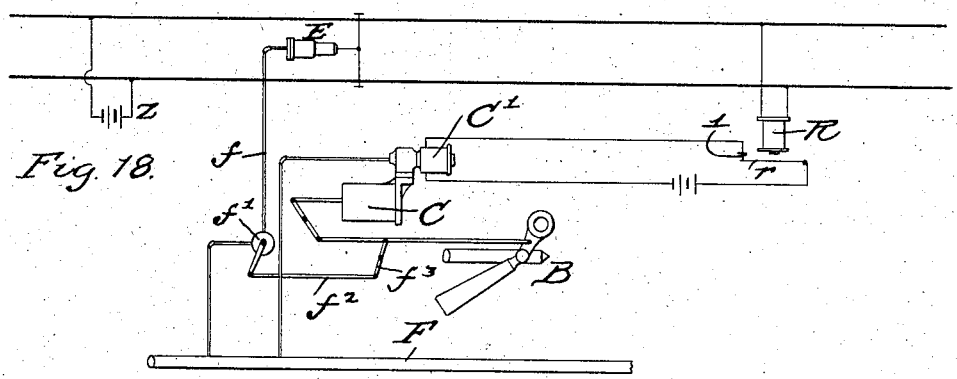
Figure 19:
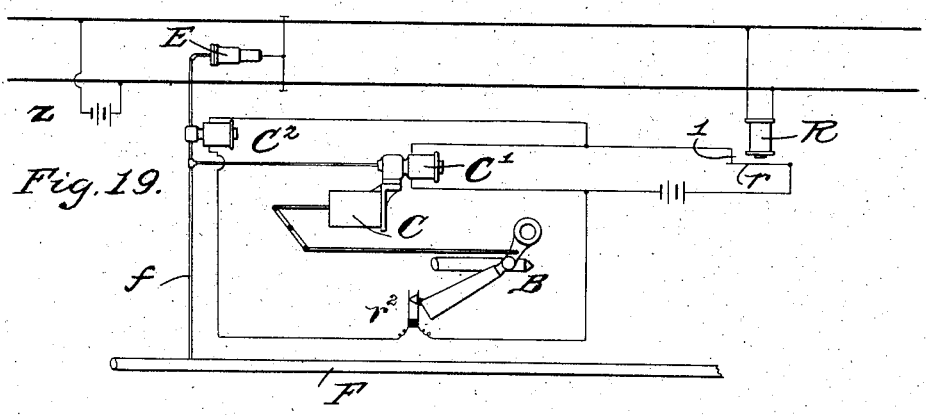

In the accompanying drawings, Figure 1 is a view in elevation of a railway-signal embodying my invention. Fig. 2 is a view, partly in elevation and partly in vertical section, of the railway-signal shown in Fig. 1. Figs. 3 and 4 are each detail views of the parts comprised in the railway-signal of Figs. 1 and 2. Fig. 5 is a view in elevation of a railway-signal shown in Fig. 1, the parts thereof being in a different position. Fig. 6 is a view similar to Fig. 2, but showing the parts in a different position. Figs. 7 and 8 are detail views similar to Figs. 3 and 4 with the parts therein shown in a different position. Fig. 9 is a view, partly in elevation and partly in horizontal section, showing another form of the railway-signal which embodies my invention. Fig. 10 is a view, partly in elevation and partly in vertical section, of a portion of the apparatus shown in Fig. 9, the section being taken on the line 10 10 of Fig. 9. Figs. 11 and 12 are detail views of the parts shown in Fig. 9. Fig. 13 is a view similar to Fig. 9, but showing the parts in a different position. Fig. 14 is a view similar to Fig. 10, but showing the parts in a different position. Figs. 15 and 16 are views similar to Figs. 11 and 12, but showing the parts in a different position. Fig. 17 is a diagrammatical view of the railway-signal shown in Figs. 13 to 16, inclusive. Figs. 18 and 19 are diagrammatical views of further modifications of my invention.

Similar characters of reference designate corresponding parts in all the figures.

I will premise that wherever I herein use the term "railway-signal" I mean to include a visual-signal device which by its color or by its position relatively to its support gives indications of the service condition of the railway-track or section of railway-track which it governs and the apparatus or mechanism for moving the signal device from one position of indication to another.

Referring now to the drawings, A designates a railway-car adapted to be propelled over a railway-track A', which, as usual, consists of parallel lines of rails divided into sections, the parallel lines of rails in each section being insulated from the parallel lines of rails in the adjoining sections. The railway-car may be propelled by any desired means. In Figs. 10 and 14 the railway-car is supposedly provided with an electric motor, the current for which is supplied from a conductor-rail $A^2$ suitably insulated from the ground and located adjacent the railway-track A'.

B designates a signal device pivoted to a support B' and here shown as being of the semaphore type and as comprising a blade $b$ and a casting $b'$ of such weight as to overbalance the blade $b$ of the signal device. The casting $b'$ is provided with openings to receive lenses which are adapted to be used in connection with a lamp so supported relatively to the lenses that indications of the service condition of the railway-track may be given at night. The blade $b$ is adapted to give indication of the service condition of the railway-track during the day, and such indications are given by its position relatively to its support. When the blade is in a horizontal position relatively to its support, such position denotes "danger." When the blade $b$ is in an oblique or inclined position relatively to its support, such position denotes "safety" or "clear."

The apparatus or mechanism for moving the signal device from one position of indication to another is preferably such that it is effective only to move the signal device from danger position to the safety position, and when the apparatus is ineffective to hold the signal device in safety position the casting $b'$ will then act to move the signal device to the danger position. I preferably employ a fluid-pressure apparatus for moving the signal device from one position of indication to another, and the fluid-pressure from the fluid-pressure supply to such mechanism is preferably electrically controlled. By "fluid-pressure" I mean a liquid or gas under pressure. I preferably employ a gas, such as air, and under a pressure at least sufficient to operate the fluid-pressure apparatus.

C designates the fluid-pressure apparatus, here shown as consisting of a cylinder $c$ and a piston $c'$ movable in said cylinder.

C' designates an electrically-operated valve device for controlling the supply of fluid-pressure to the fluid-pressure mechanism. This electrically-operated valve device may conveniently be of the construction illustrated and described in United States Patent No. 357,109, issued February 1, 1887, to George Westinghouse, Jr., for electrical interlocking mechanism for switches and signals, to which patent reference may be had for details of construction and operation.

The piston $c'$ of the fluid-pressure apparatus is operatively connected to one end of a lever $c^2$, pivoted between its ends and having its other end operatively connected with a rod $c^3$, which in turn is operatively connected with the signal device. It will be observed, therefore, that when the piston $c'$ is moved in one direction the lever $c^2$ is rocked on its pivot and the rod $c^3$ will move the signal device from one position of indication to another. So long as the piston $c'$ is held in the position to which it has been moved the signal device will be correspondingly held.

The electrically-operated valve device C' is adapted to be controlled from a track-relay magnet R included in a track-circuit of the section of railway-track which the railway-signal is designed to govern. The track-circuit as, usual, comprises a battery Z, the poles of which are connected to the opposite lines of rails and the relay-magnet R, the terminals of the windings of which are electrically connected with the opposite lines of rails. So long as the track-circuit is not in any way interrupted the relay-magnet R will be energized and will hold its armature $r$ against a contact 1. The armature $r$ and contact 1 are included in a circuit which also includes the magnet of the electrically-operated valve device and a battery Z. So long as the armature $r$ is engaged with the contact 1 the circuit through the magnet of the electrically-operated valve device will be closed, and the valve of such device will be held open to admit fluid-pressure to the fluid-pressure mechanism.

It is contemplated by my invention that the brakes on the railway-car be actuated, preferably, by fluid-pressure—as, for example, compressed air. Any such system of brakes may be employed provided it shall comprise in the system any means or device through which the fluid-pressure may be exhausted from the system, which will then act to set the brakes. In the drawings I have shown the braking system as comprising a train-pipe $A^3$, provided with a valve $a$, which may be turned to permit fluid-pressure to escape from the train-pipe, and thus automatically set the brakes.

D designates a device, here shown as being in the form of a trip, for operating the brake system of a passing car to set the brakes when in its effective position. Means are provided for moving the device D into its effective position and to a position in which it is ineffective. In Figs. 1 to 8 the fluid-pressure apparatus C is adapted to operate the device D. The means for moving the device D into and out of effective position are here shown as consisting of a shaft $d$, suitably journaled on bearings $d'$. The shaft $d$ is rotated by means of a lever $d^2$, one end of which is fast to the shaft $d$ and the other end of which is connected by a rod $d^3$ with the piston $c'$ of the fluid-pressure mechanism. The parts just described are so adjusted that when the signal device is in the position indicating "safety" the trip D will be in a position to be ineffective; but when the signal device is in the position indicating "danger" the trip will be in a position to be effective in the present case—that is, it will be in such position to engage the valve $a$ in the train-pipe to operate it and permit the fluid-pressure to escape from the train-pipe. In Figs. 1, 2, 3 and 4 the signal device is in a position indicating "safety," and consequently the trip D will be ineffective to operate the valve $a$ in the train-pipe. In Figs. 5, 6, 7 and 8 the signal device is in a position indicating "danger," and the trip D is in a position to engage the valve $a$ in the train-pipe. The signal device in these figures is shown as being in the "danger" position by reason of a pair of wheels being upon the parallel lines of rail-section which short-circuits the relay R. The circuit including the armature and the valve device will be opened, and hence fluid-pressure is cut-off from the fluid-pressure mechanism.

In Figs. 9 to 17 I have illustrated the device D as being operated by a separate fluid-pressure apparatus (designated E) the fluid-pressure for which is supplied from the same source as for the fluid-pressure apparatus C of the railway-signal, and the fluid-pressure for the fluid-pressure apparatus E is controlled by the electrically-operated valve device C'. The fluid-pressure apparatus E is here shown as consisting of a cylinder $e$ and the piston $e'$ movable therein. The piston $e'$ is operatively connected with the shaft $d$, and when moved to one end of the cylinder $e$ under the influence of the fluid-pressure it compresses a spring $e^2$. When fluid-pressure is cut-off from the apparatus E, which will be when fluid-pressure is cut off from the apparatus C, the spring operates to move the piston $e'$ to the opposite end of the cylinder and to set the trip D in its effective position. The operation of the railway-signal in connection with the trip, as illustrated in Figs. 9 to 17, is precisely the same as that described in connection with the railway-signal shown in Figs. 1 to 8, inclusive.

In Fig. 18 I have shown the fluid-pressure apparatus E as being supplied with fluid-pressure from a main F through a pipe $f$. A valve $f'$ is provided in this pipe which is mechanically-operated from the railway-signal. The mechanical connection is here shown as being a rod $f^2$, connected with the valve $f'$ and moved by a lever $f^3$, fulcrumed between its ends and connected with the rod $c^3$ of the railway-signal.

In Fig. 19, I have shown a separate electrically-operated valve device (designated $C^2$) for controlling the pipe $f$. This valve device may conveniently be of the same construction and operation as the valve device $C'$. The magnet of this valve device is included in a circuit in which the relay $r$ is also included. A second circuit-breaker $r^2$ is also included in this circuit and is operated from the railway-signal—as, for example, the signal device B.

The operation of the railway-signal in connection with the trip D, as illustrated in Figs. 18 and 19, is precisely the same as that described in connection with the railway-signal shown in Figs. 1 to 17.

It is obvious that brake systems on cars other than the type of brake system herein described may be automatically operated by the device D. It is also obvious that the device D may be used in connection with automatic railway-signals, employing a motive power different from that herein set forth.

The advantages of this invention will be readily seen to those skilled in the art.

This type of railway-signal is particularly advantageous where the conditions are such that the signal cannot be quickly and readily seen by the operator of the train or car.

What I claim as my invention is—

1. The combination with a railway-signal comprising a signal device and fluid-pressure apparatus operatively connected with the signal device, of means controlled by the passage of a train over a railroad or section of railroad-track for controlling the supply of fluid-pressure to said fluid-pressure apparatus, a trip adjacent the railway-track and means operated from the fluid-pressure apparatus for moving said trip.

2. The combination with a railway-signal comprising a signal device and an automatically-operated apparatus operatively connected with the signal device, of means controlled by the passage of a train for governing the operation of said apparatus, a trip adjacent to the railway-track, a device for operating the trip, and means operated from the railway-signal for automatically controlling the operation of said device.

3. The combination with a railway-signal comprising a signal device and an automatically-operated apparatus operatively connected with the signal device, of means controlled by the passage of a train, a trip adjacent the railway-track, fluid-pressure means for operating the trip, and means operated from the railway-signal for automatically controlling the supply of fluid-pressure to said fluid-pressure means.

In testimony whereof I have signed my name to this specification in the presence of two subscribing witnesses.

JOHN PRESSLEY COLEMAN.

Witnesses:
W. L. McDANIEL,
JAMES CHALMERS, Jr.